Sept. 6, 1949.   F. ANDERSON   2,480,826
APPARATUS FOR WORKING SHEET METAL
Filed Feb. 19, 1942   11 Sheets-Sheet 1
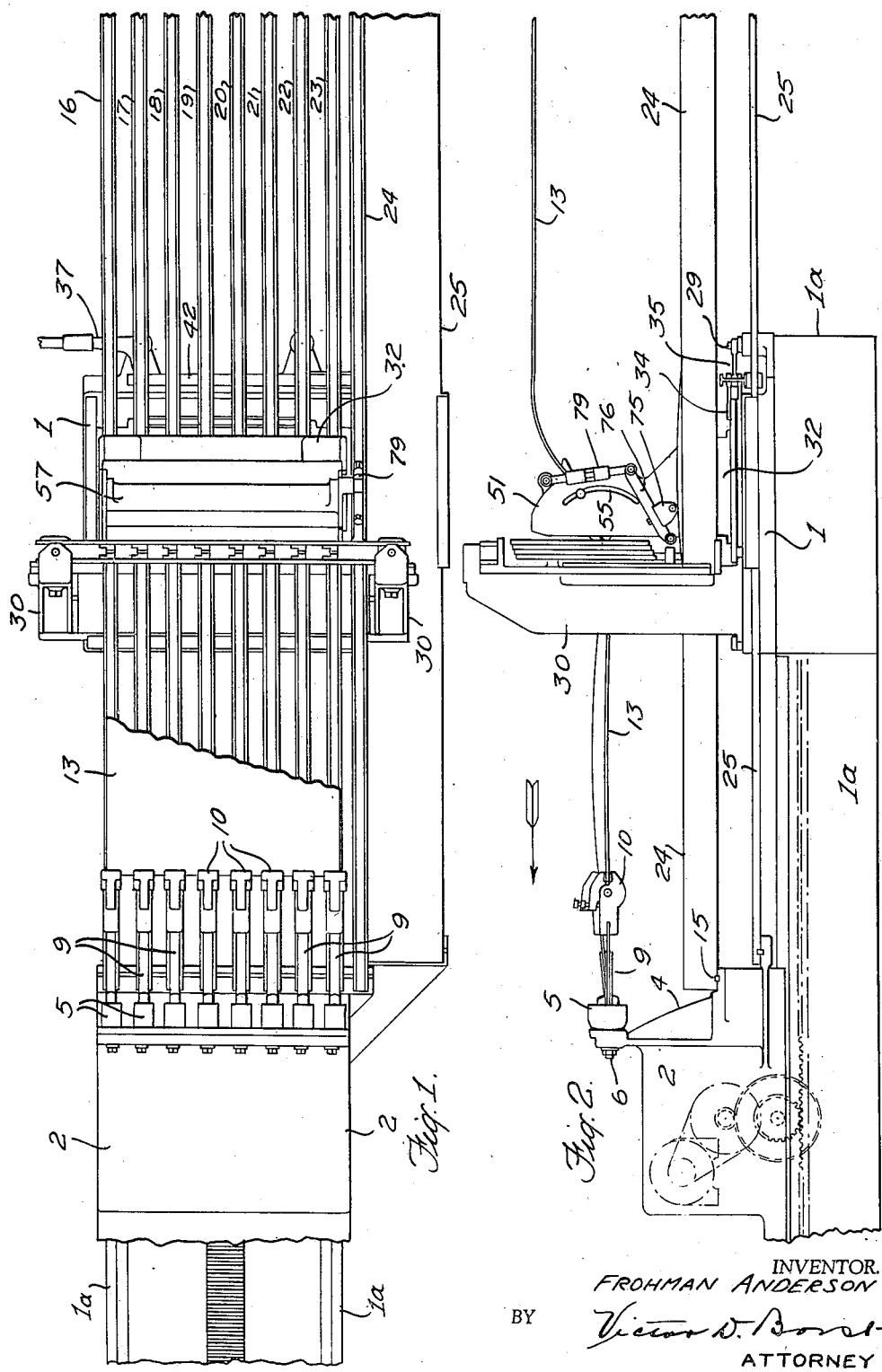
INVENTOR.
FROHMAN ANDERSON
BY
ATTORNEY

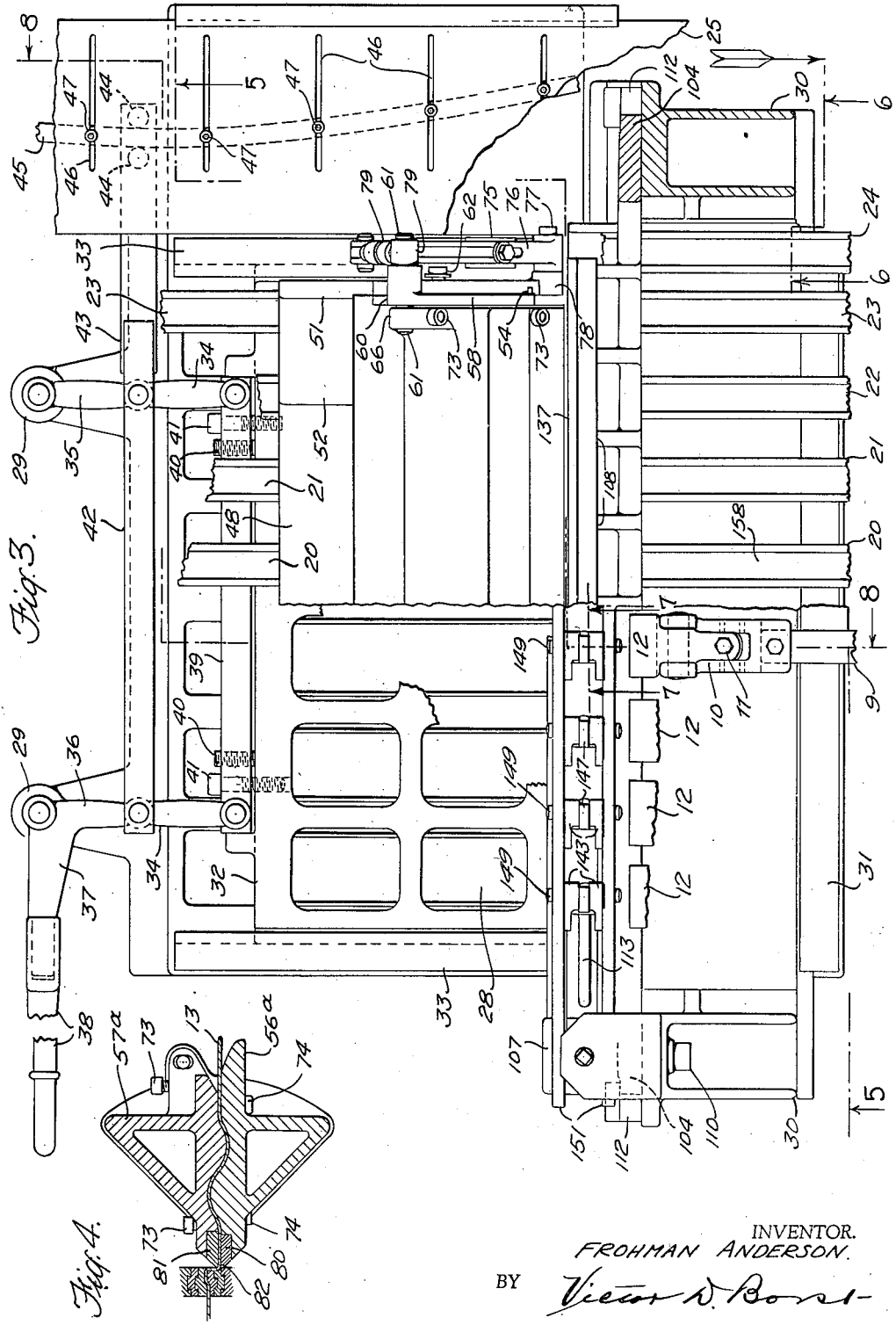

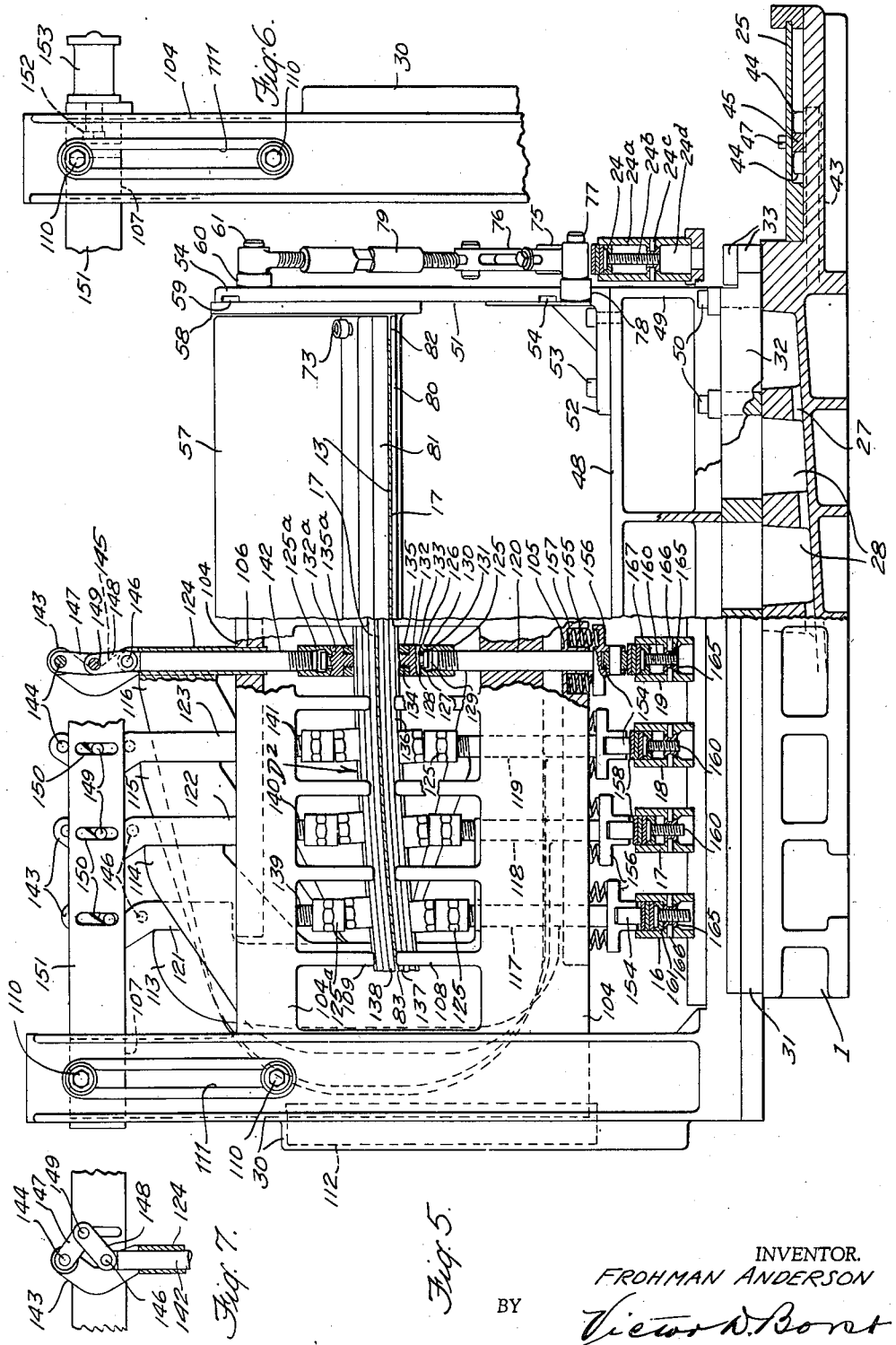

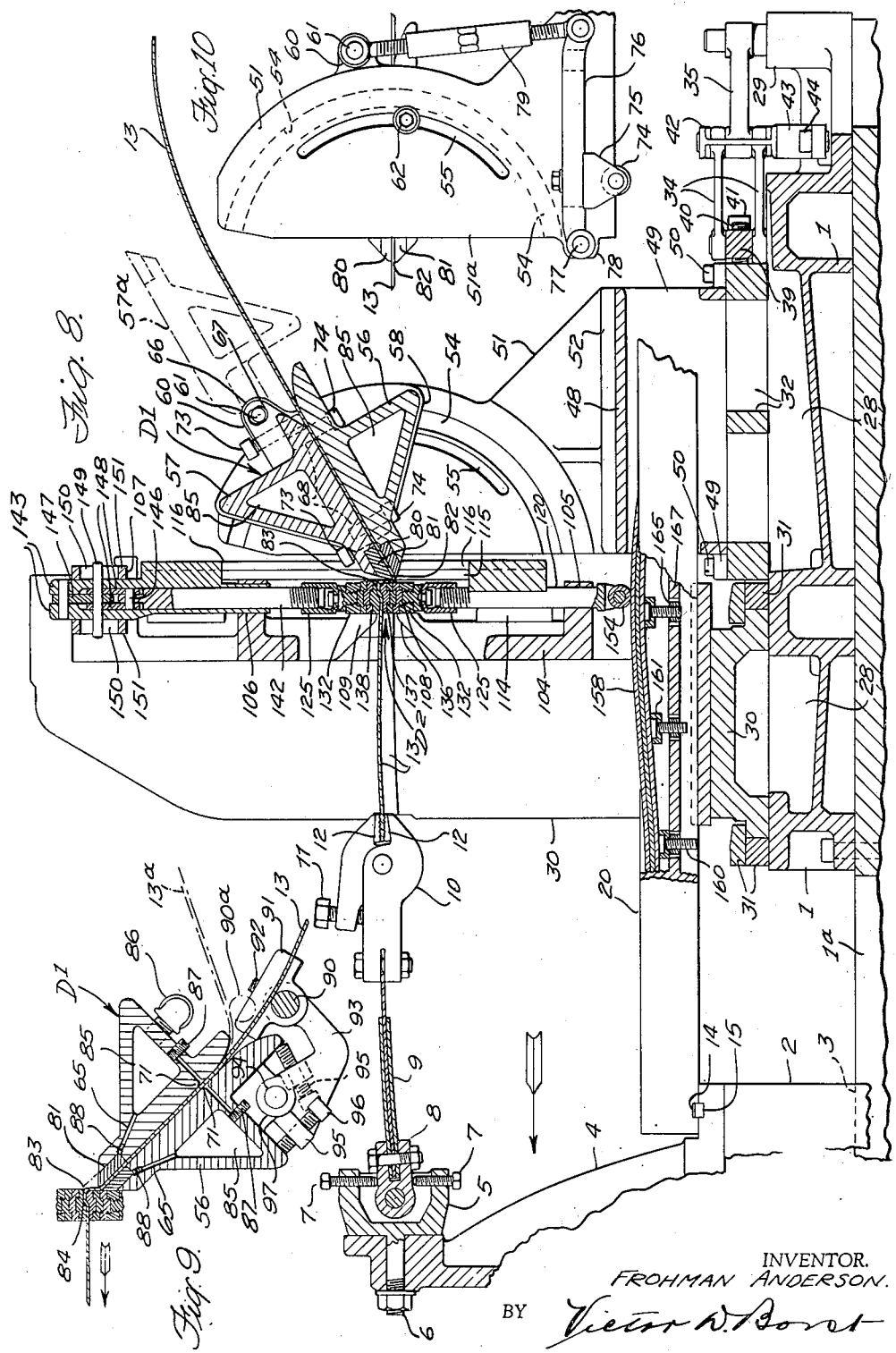

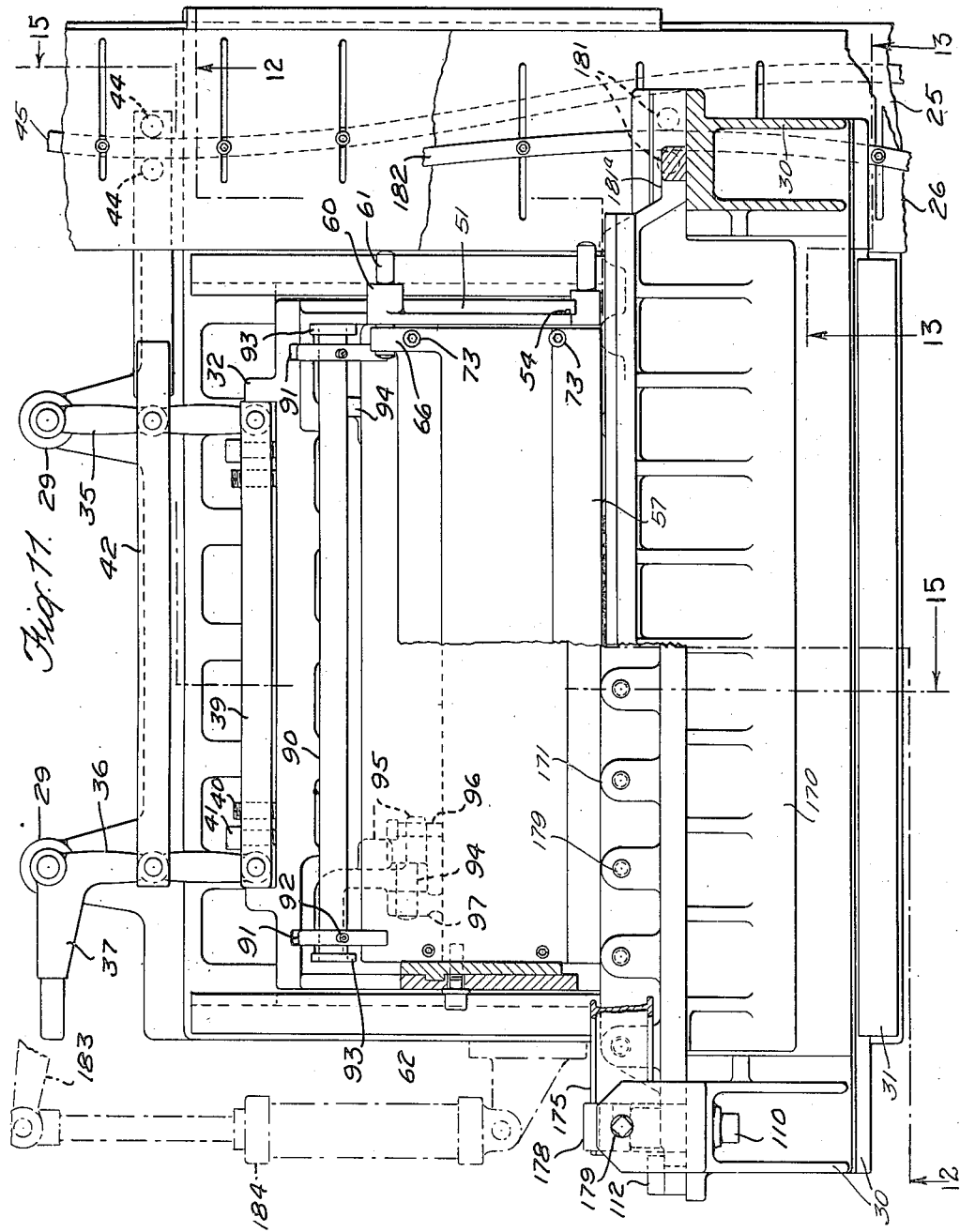

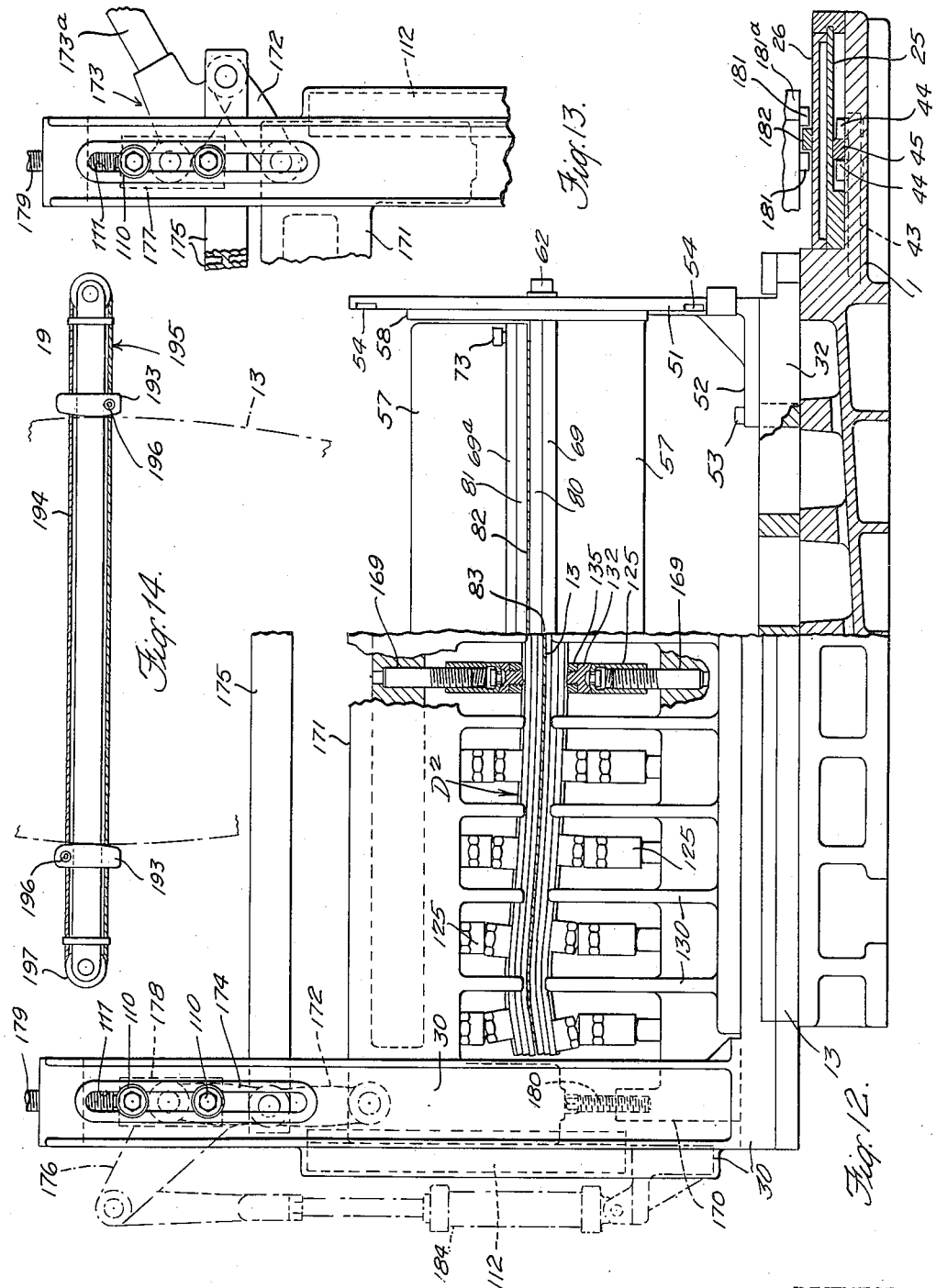

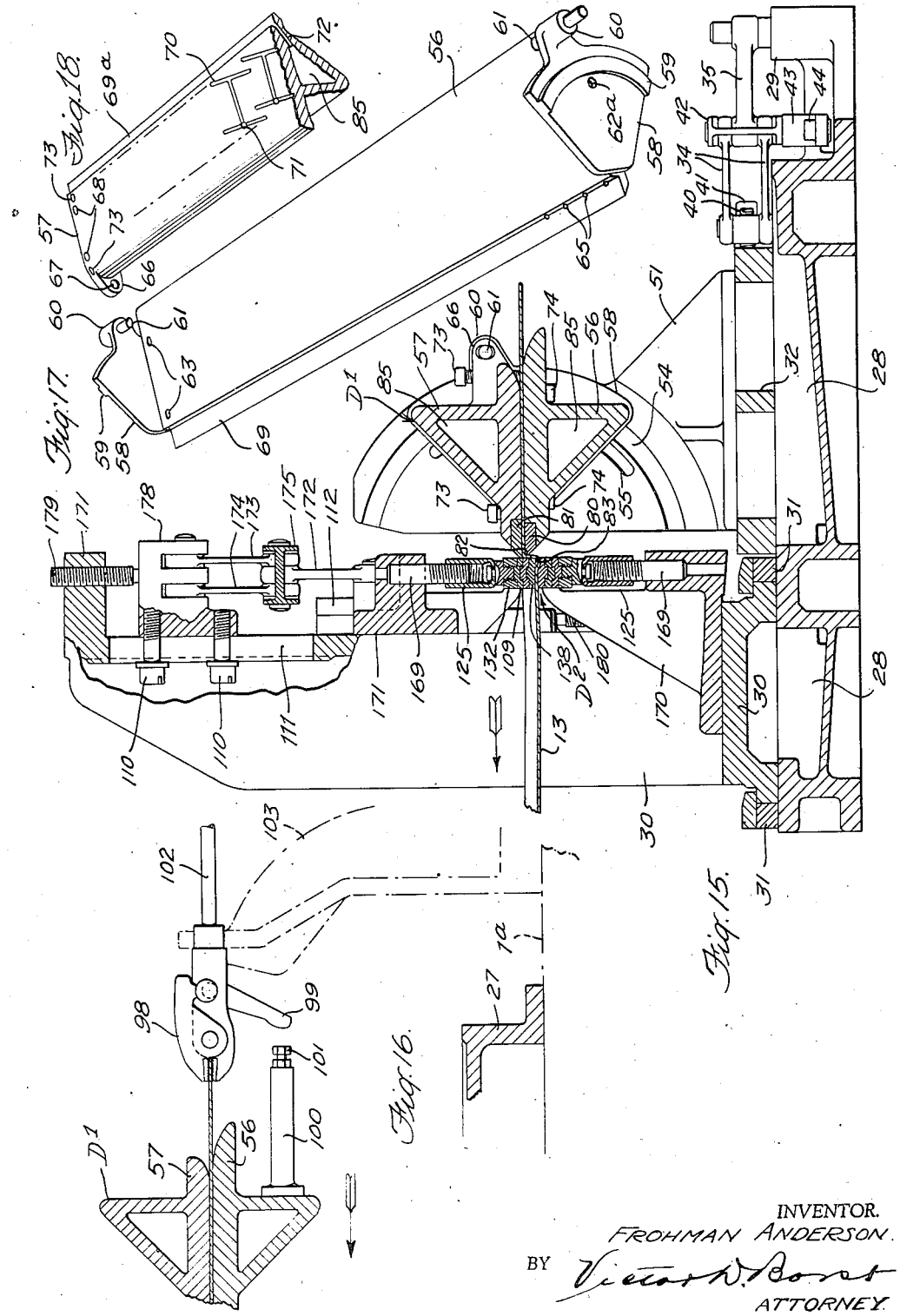

Sept. 6, 1949.  F. ANDERSON  2,480,826
APPARATUS FOR WORKING SHEET METAL
Filed Feb. 19, 1942  11 Sheets-Sheet 8
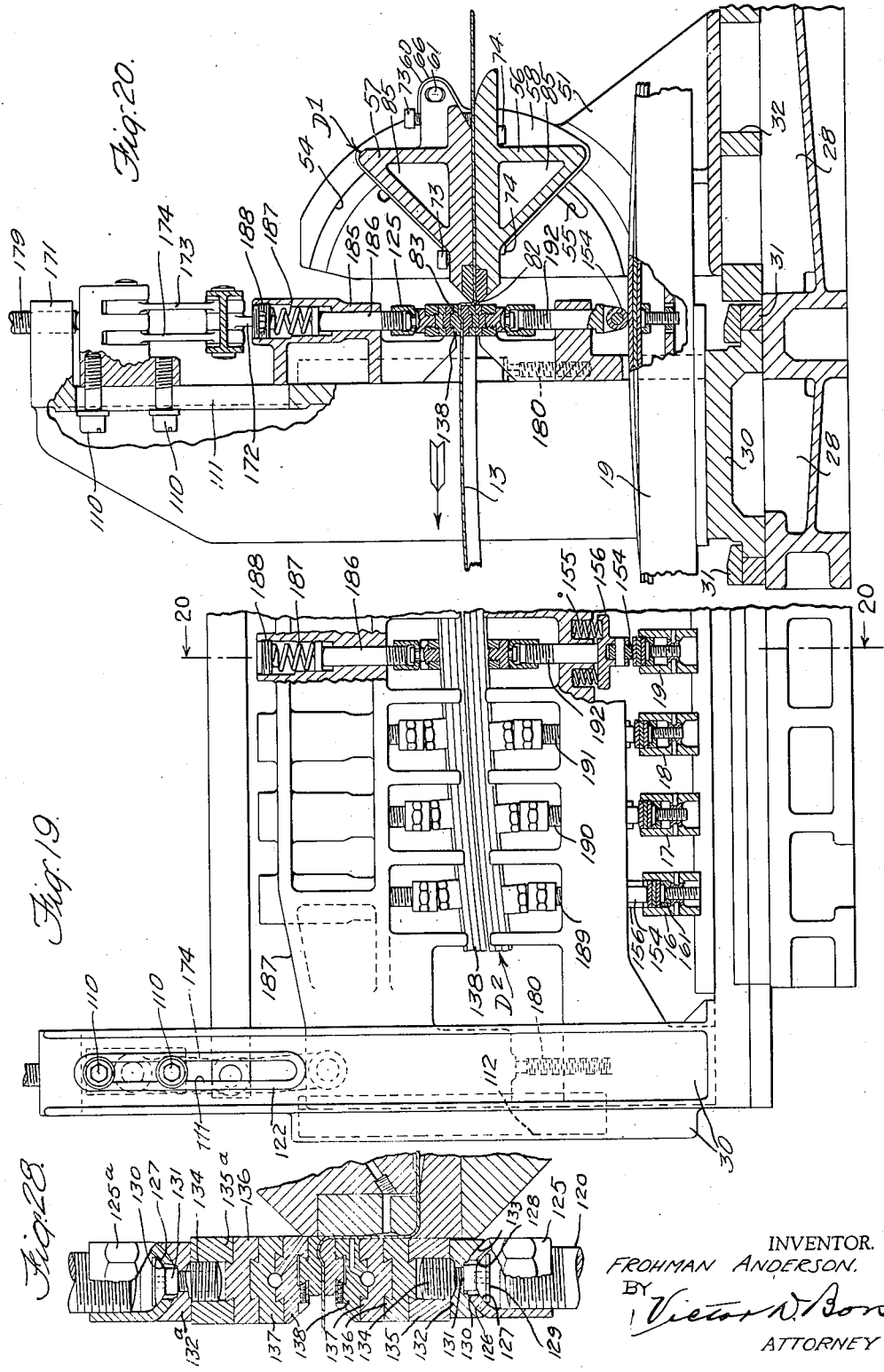
INVENTOR.
FROHMAN ANDERSON.
BY
Victor W. Borst
ATTORNEY

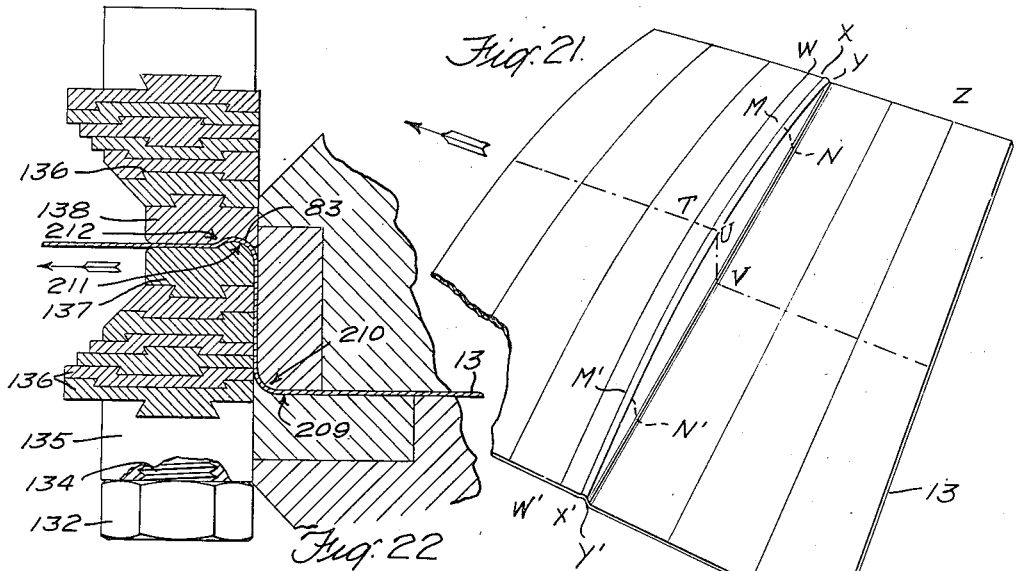
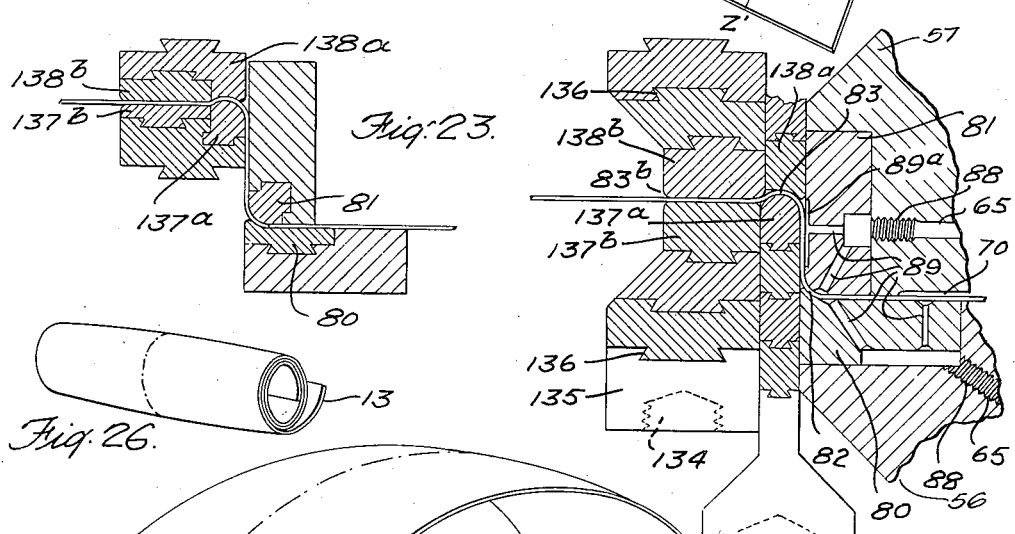
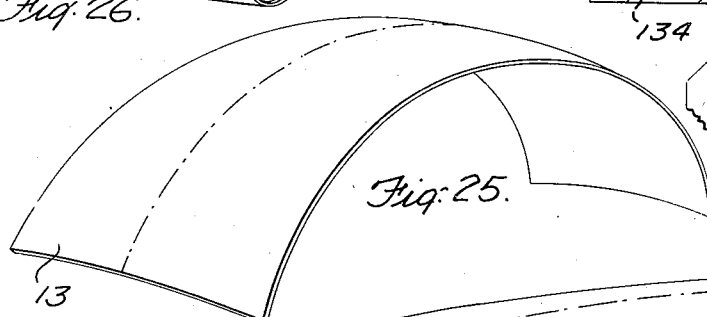
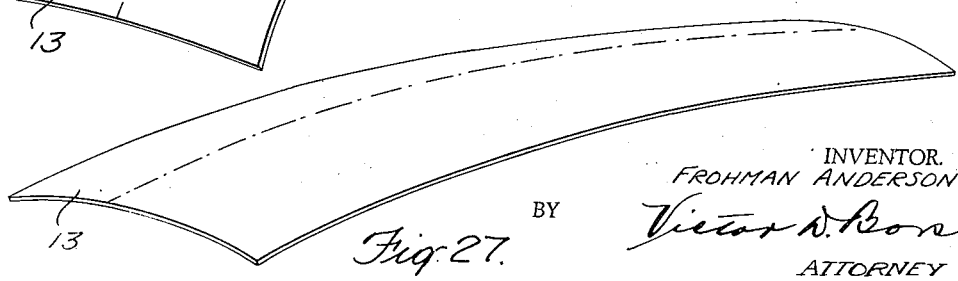
INVENTOR.
FROHMAN ANDERSON
BY
ATTORNEY Sept. 6, 1949. F. ANDERSON 2,480,826
APPARATUS FOR WORKING SHEET METAL
Filed Feb. 19, 1942 11 Sheets-Sheet 10
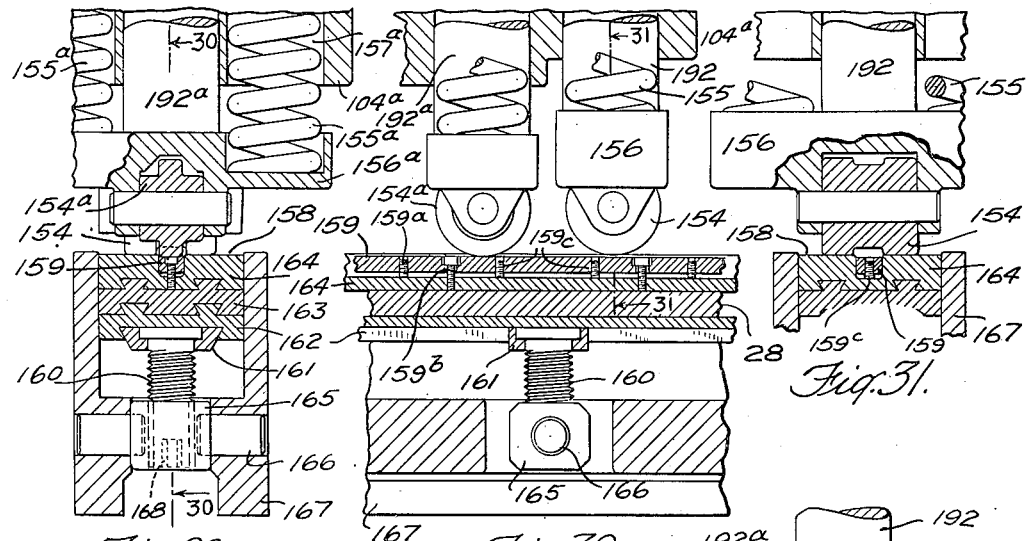
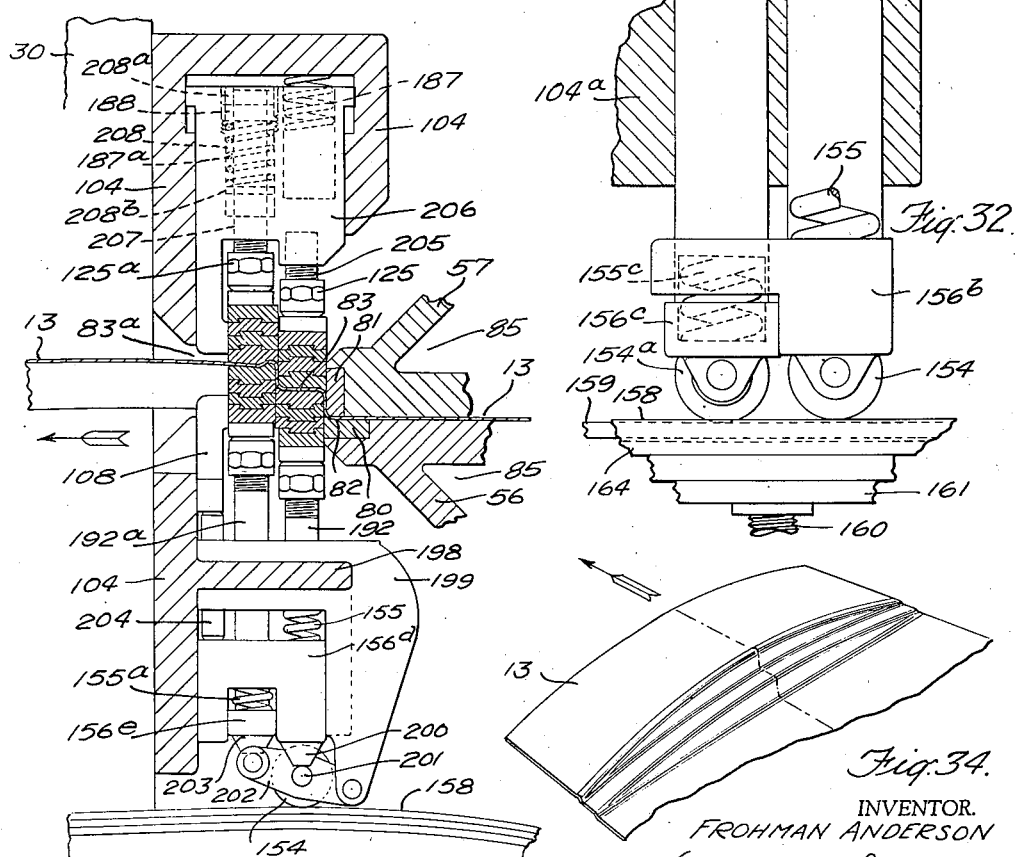
INVENTOR.
FROHMAN ANDERSON
BY Victor D. Borst
ATTORNEY Sept. 6, 1949.  F. ANDERSON  2,480,826
APPARATUS FOR WORKING SHEET METAL
Filed Feb. 19, 1942  11 Sheets-Sheet 11
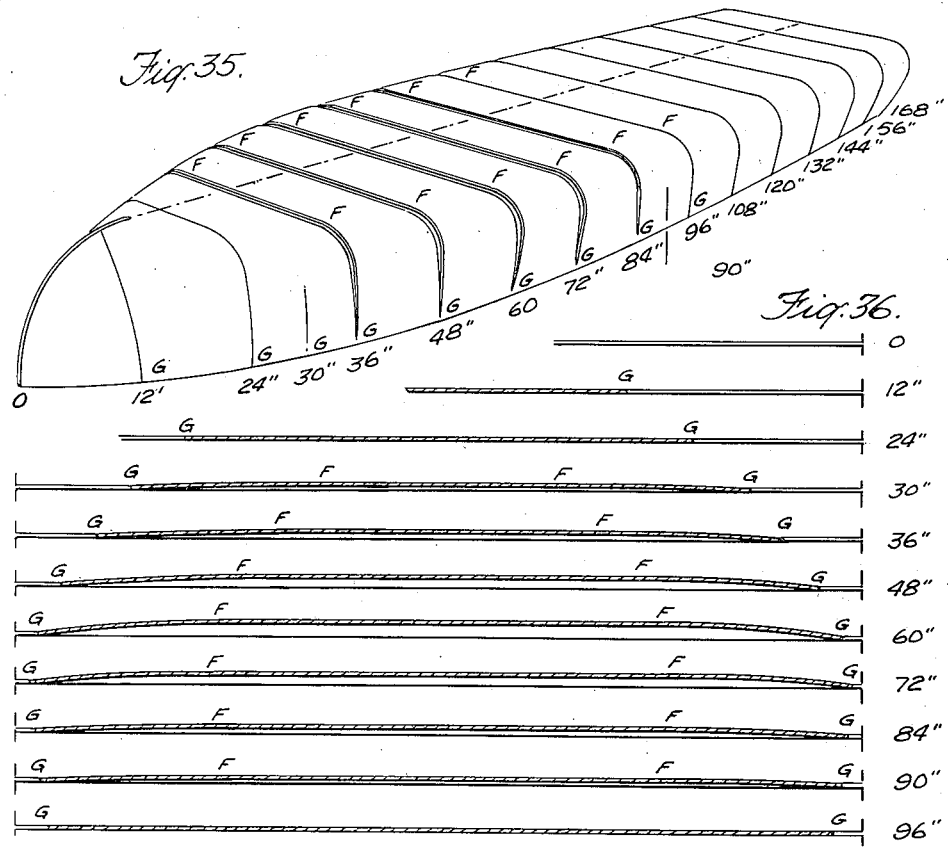
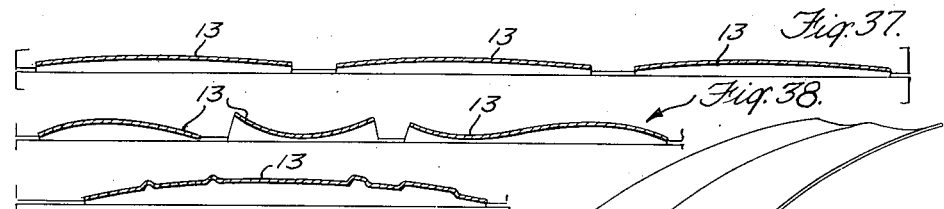
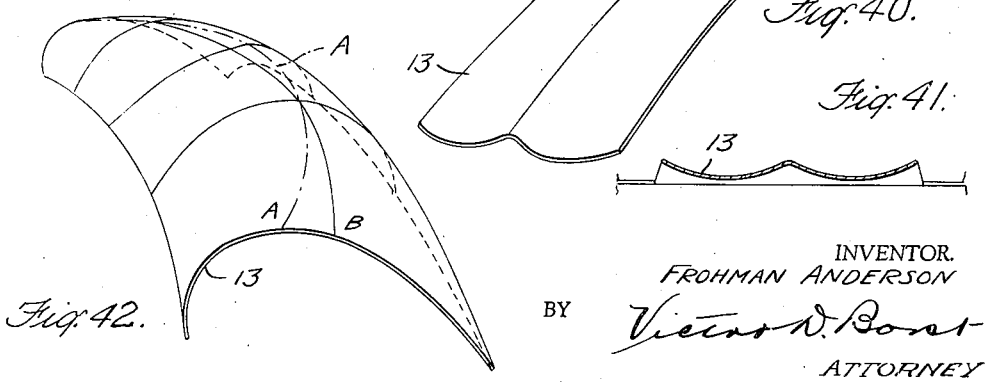
INVENTOR.
FROHMAN ANDERSON
BY
ATTORNEY Patented Sept. 6, 1949

2,480,826

UNITED STATES PATENT OFFICE 2,480,826

APPARATUS FOR WORKING SHEET METAL

Frohman Anderson, Brooklyn, N. Y.

Application February 19, 1942, Serial No. 431,528

32 Claims. (Cl. 153—2)

This application is in part a continuation of copending application Serial No. 317,830, filed February 2, 1940, now U. S. Patent 2,395,651.

The invention relates in general to the art of working sheet metal to give it compound curvatures, and is particularly useful where the sheets to be worked are of such a size that a reciprocating press would not be practical for the purpose.

More particularly my invention relates to that class of sheet metal working in which a sheet is pulled through engaging members that are calculated to impart to the sheet a differential longitudinal stretching, that is, a longitudinal stretching that varies in degree transversely or from one edge to the other. It is manifest that such treatment of a sheet will impart to it a compound curvature depending upon the amount and distribution of the stretching.

It is characteristic of my invention that the engaging members are of different shape and produce such a frictional drag upon the sheet that the sheet is continuously dimensionally distorted during its passage through the engaging members proportionally to the difference in distance between the coacting engaging points of the two members.

The differential longitudinal stretching of any selected pattern will impart to a sheet a predetermined change in surface area which will enable the sheet to assume any of an infinite number of related compound curvatures, the theoretical limits being an infinite radius of longitudinal curvature coincident with a zero radius of transverse curvature, and a zero radius of longitudinal curvature coincident with an infinite radius of transverse curvature. For each longitudinal curvature at any point there is one and only one transverse curvature.

The particular pair of principal curvatures that the sheet assumes at any point depends upon the net difference in stretching of the sheet throughout its thickness at that point parallel to its surfaces, and the invention contemplates controlling the differential stretching in that dimension. This latter control is particularly essential in connection with the drawing method that is characteristic of the invention.

Specifically the engaging members are slotted dies each having a working edge over which the sheet is drawn and upon which sufficient drag is produced to effect the desired differential longitudinal stretching. Most simply the invention is illustrated by two such dies, the rear one having, say, a straight working edge and the advance die having a curved working edge. In order that the requisite drag may be produced over these edges the sheet is given a sharp bend over them. In other words the dies are staggered with respect to the movement of the sheet, and they engage the sheet on opposite sides or surfaces.

It is obvious that at these sharp bends the sheet is stretched unequally throughout its thickness and there is effected in the sheet a net result of this unequal stretching which may produce a sheet with an undesirable shape even though the surface area is correct. It is the differential stretching of the sheet throughout its thickness that the invention aims to control and thereby determine the ultimate shape of a sheet for a given differential longitudinal stretching.

The invention contemplates suitable means for effecting the results mentioned. Also the invention involves the altering of the stretching of the sheet in its various dimensions, either progressively or in steps, as the sheet is being drawn through the dies, and to this end either the shape or relative location of the dies is susceptible of change at will.

In the drawings:

Fig. 1 is a plan view on a small scale diagrammatically showing the general arrangement of my apparatus;

Fig. 2 is a diagrammatic side elevation on the same scale as Fig. 1;

Fig. 3 is a plan view partly broken away showing the general arrangement of the various dies and operating mechanism therefor in one form of my apparatus;

Fig. 4 is a section taken longitudinally of the apparatus through the first die showing a modified form of slot which may be used to impose an additional drag on the sheet as it is pulled through the die;

Fig. 5 is a transverse section taken substantially on the line 5—5 of Fig. 3;

Fig. 6 is a fragmentary elevational view of one portion of the apparatus as viewed from a position indicated by the line 6—6 of Fig. 3;

Fig. 7 is a detail sectional view taken on the line 7—7 of Fig. 3;

Fig. 8 is a longitudinal section taken substantially on the line 8—8 of Fig. 3;

Fig. 9 is a view similar to Fig. 4 showing a different form of mechanism for imposing a drag upon the sheet, in combination with guide blocks which engage the side of the sheet to guide it into the die;

Fig. 10 is a fragmentary side elevation showing the adjustable mounting of the first die and means which are engaged by a movable cam track for changing the adjustment of the die during the movement of the sheet through the die;

Fig. 11 is a view similar to Fig. 3 of a simplified form of my apparatus showing incorporated therein the drag exerting and guiding mechanism shown in Fig. 9;

Fig. 12 is a transverse section taken substantially on the line 12—12 of Fig. 11;

Fig. 13 is a fragmentary elevational view as viewed from the position indicated by the line 13—13 of Fig. 11;

Fig. 14 is a plan view of another form of guiding means for guiding the sheet into the first die;

Fig. 15 is a longitudinal section taken substantially on the line 15—15 of Fig. 11;

Fig. 16 is a fragmentary view partially in section showing still another means for exerting a drag upon the sheet as it is pulled through the dies;

Fig. 17 is a perspective view of the lower part of the first die;

Fig. 18 is a fragmentary perspective of the upper portion of the first die;

Fig. 19 is a fragmentary transverse section showing still another form of my apparatus;

Fig. 20 is a fragmentary longitudinal section taken on the line 20—20 of Fig. 19;

Fig. 21 is a perspective view of a metal sheet showing how it is stamped and formed as it passes through the dies and over the working edges illustrated in Fig. 20;

Fig. 22 is an enlarged fragmentary longitudinal section through a pair of dies such as could be used to form the sheet shown in Fig. 21. In this view the first die is not mounted for angular adjustment in the manner illustrated in the preceding views;

Fig. 23 is a view similar to Fig. 22 showing a slightly different construction of the dies and illustrating the manner in which the removable and replaceable inserts may be used where the most wear occurs;

Fig. 24 is a view similar to Fig. 22 showing a still different construction and arrangement of the dies;

Figs. 25, 26 and 27 are perspective views of three different sheets in all of which the longitudinal stretching throughout the width of the sheet was the same and in which the differential stretching throughout the thickness of the sheet in each of the forms was different;

Fig. 28 is an enlarged longitudinal section through a pair of dies, one of which is flexible, illustrating the manner in which the flexible die is mounted in the apparatus;

Fig. 29 is an enlarged transverse sectional view through one of the cam tracks in the lower end of the cooperating push rods through which the geometrical shape and the vertical position of the flexible dies is controlled;

Fig. 30 is a longitudinal section taken on the line 30—30 of Fig. 29;

Fig. 31 is a fragmentary section taken on the line 31—31 of Fig. 30;

Fig. 32 is a fragmentary sectional side elevation of the lower end of a different form of the push rod assembly;

Fig. 33 is a fragmentary central longitudinal section through still another arrangement of dies and the operating mechanism therefor;

Fig. 34 is a fragmentary perspective view of a metal sheet showing the form it takes and how it is bent as it passes through the dies illustrated in Fig. 33;

Fig. 35 is a perspective view of an inverted boat jig covered by a transversely slitted plane sheet showing the different surface areas which must be imparted to the sheet at the various stations to form the boat illustrated;

Fig. 36 shows a series of transverse sections through a sheet taken just after it has been drawn over the second working edge which cooperates with the first working edge to impart the differential longitudinal stretching to the sheet. These sections correspond to the various stations indicated in Fig. 35;

Fig. 37 is a view looking into the discharge end of a die constructed for simultaneously forming a plurality of identical sheets;

Fig. 38 is a view similar to Fig. 37 showing a die for simultaneously forming a plurality of differently curved sheets;

Fig. 39 is a view similar to Figs. 37 and 38 showing a die forming a series of reinforcing ribs through the sheet as it is being formed;

Fig. 40 is a perspective view of the sheet which has been formed with my apparatus;

Fig. 41 is a view similar to Figs. 37, 38 and 39 showing the construction of one of the dies used in forming the sheet illustrated in Fig. 40; and Fig. 42 is a perspective view of another sheet which has been formed by my apparatus.

In forming sheets, having a desired compound curvature therein, according to my process with the apparatus disclosed herein the sheet is pulled through a plurality of slotted dies each of which has incorporated therein a working edge over which the sheet is bent in first one direction and then in the reverse direction. The working edges which are of different geometrical shape are disposed in stepped relation with respect to the movement of the sheet, and are arranged to successively engage the sheet on opposite sides thereof. Some of the dies and the working edges therein cooperate with each other to differentially stretch the sheet longitudinally throughout its width. This differential longitudinal stretching imparts a predetermined change in surface area to the sheet which is dependent upon the difference in geometrical shape of the working edges and their relative positions with respect to each other.

The last die and the working edge therein functions to differentially stretch the sheet throughout its thickness. It is the amount and character of this differential stretching throughout the thickness of a sheet, which has already had imparted to it a predetermined change in surface area, that determines the final curvatures imparted to the sheet, both longitudinal and transverse. The dies are all adjustably mounted and means are provided for changing the relative position of the dies, and their working edges, to each other during the movement of the sheet through the dies. Means are also provided which engage the sheet and act to retard its movement through the die, or exert a drag thereon. This drag is necessary to the longitudinal stretching of the sheet, for if the sheet was permitted to be pulled freely through the dies there would be no longitudinal stretching. This drag is exerted in several ways. One is by the bending of the sheet over the working edges, especially the working edge in the first die; another is by the frictional engagement of the sheet between the cooperating sections of the dies, and still another is by independent means which are arranged to engage and/or grip the sheet and act to retard its movement.

The first die is mounted for longitudinal movement, and for angular adjustment about an axis which is substantially coincident with the working edge therein. This double adjustment of the first die accomplishes two things. First it varies the angle at which the sheet is bent over the working edge therein which varies the drag exerted on the sheet, the more acute the angle the greater the drag; and second it varies the distance between the first and second working edges which will vary the amount the sheet is longitudinally stretched between these two edges, the greater the distance the less the stretch and vice versa.

The other dies are mounted for movement both transversely to and perpendicularly to the movement of the sheet. Also the geometrical shape of any or all of the working edges, except the first, may be changed. Any or all of the various adjustments may be fixed or they may be varied as desired, while the sheet is being pulled through the dies, by cam tracks which are moved in timed relation to the movement of the sheet. With this arrangement it is possible to vary both the longitudinal stretching and the differential stretching throughout the thickness of a sheet as desired while the sheet is being pulled through the dies, and in this manner impart to the sheet any desired pair of principal curvatures at any point.

As shown in Figs. 2 and 8 the base 1 is rigidly secured to a bed 1a along which a slide 2 having grooved sliding surfaces 3 is moved. The slide 2 is power driven by any conventional means and travels along the bed 1a in the direction of the arrow when drawing a sheet through the machine. Mounted on the slide 2 is a standard 4 to which adjusting blocks 5 are rotatably mounted by studs 6. Clamps 10 are operatively secured to the blocks 5 by spring straps 9, lugs 8 and adjusting screws 7. The clamps 10 have serrated jaws 12 between which the forward end of a sheet 13 is clamped by screws 11.

The standard 4 has a keyway 14 and keys 15 for mounting adjustable and interchangeable cam units numbered generally as 16 to 26 inclusive, which will be described later.

Cores 28 and drains 27 in the base 1 (Fig. 5) collect the surplus lubricant used, as will hereinafter be described, from whence it is pumped, cleaned and re-used.

A slide 30, comprising a rigid U-shaped member is slidably mounted, for transverse movement, on the base 1 by gibs 31. This slide carries all of the dies, as will be hereinafter described, except the first die.

A second slide 32 on which the first die mechanism is mounted, is slidably mounted on the base 1 for longitudinal movement towards and away from the cross slide 30 and is guided by gibs 33 (Fig. 5). To control the movement and position of the slide 32, there is provided a toggle link construction as best shown in Figs. 3 and 8. The toggle construction consists of a pair of links 34 which are pivotally connected to links 35 and 36 respectively. The rear ends of links 35 and 36 are pivotally connected to rearward extensions 29 on the base 1 and the forward ends of the links 34 are pivotally connected to a bar 39, adjustably secured to the slide 32. The purpose of the bar 39 is to adjust the position of the slide 32 which is done by the setscrews 40 and clamping screws 41.

A cross link 42 connects the pivotally connected ends of links 34 and 35 to the pivotally connected ends of links 34 and 36. A link 36, pivotally connected to an extension 29 on the base 1, has an arm 37 to which a socketed handle 38, for manually imparting angular movement to the toggles is attached. Thus, by operating handle 38, the links may be moved from an in-line position, as shown in Fig. 1, into an angular relation, thereby retracting the slide 32. The slide 32 may also be moved by motion imparted to an extension 43 which is rigidly attached to the cross link 42. The end of the extension 43 supports cam rollers 44 which are in constant contact with a cam member 45 adjustably attached to the cam plate 25. The cam plate 25 is moved by the slide 2 to which it is secured. The cam member 45 is held and adjusted by means of screws 47 engaging the plate 25 through slots 46. The slide 32 may also be moved by motion imparted to arm extension 183 (Fig. 11) actuated by an hydraulic cylinder 184 hereinafter described or by other means.

A transversely extending platform 48 is secured to the slide 32, in spaced relation thereto, by legs 49 at each end thereof, and bolts 50. An upwardly extending standard 51 is secured to each end of the platform 48 by bolts 53 passing through flange 52 formed integral with the lower ends of the standards 51. The standards 51 have arcuate grooves 54 formed on their inner faces, and have slots 55 adjacent to and concentric with the grooves 54.

The first die $D^1$ comprises lower and upper parts 56 and 57 respectively which are adjustably held in spaced relation to each other so as to define a passageway or throat 82 therebetween through which the sheet is pulled. The lower and upper parts 56 and 57 have seats 69 and 69a, respectively, as shown in Figs. 17 and 18, in which changeable inserts 80 and 81 (Fig. 8) are removably secured. The forward edge of the insert 80 or of the insert 81 is the working edge of die throat 82 according to the angular position of the parts 56 and 57 and their position as a unit relative to a second die throat 83.

The lower part 56 has secured thereto at each end thereof an end-plate 58, each of which has formed on its outer face an arcuate rib 59 which has the same radii as the grooves 54, and whose common center is substantially coincident with the forward opposed edges of the inserts 80 and 81.

The die $D^1$ is mounted between the standards 51 for angular adjustment, about an axis substantially coincident with the working edge therein, by means of the ribs 59 on the outer faces of the end-plates 58 and the cooperating grooves 54 on the inner faces of the standards 51. The die may be held in any desired adjustment by clamping bolts 62 which are screwed into tapped holes 62a in the end-plates 58, and are adapted to ride in the slots 55.

The angular adjustment of the die $D^1$, however, may be changed automatically as the sheet 13 passes through it (when screws 62 are loosened) by the action of an adjustable cam 24 contacting a roller 74 (Figs. 5 and 10). The roller 74 is mounted on an adjustable block 75 which may be rigidly clamped at any desired point along the length of a pivoted lever arm 76. One end of lever arm 76 is mounted on pin 77 fitted into boss 78 on standard 51. A turnbuckle link 79 is pivotally connected to the free end of the arm 76 and to a pin 61 projecting from a boss 60 on the plate 58. The cam 24 is adjusted vertically in a frame 24a along its length by screws 24b engaging the cam 24 and threaded anchor blocks 24c in the frame 24a, which frame is supported at intervals on bed 1a.

The upper part 57 of the die D¹ (Fig. 15) is held in position relative to the lower part 56 by means of pins 61 engaging elongated holes 67 in ears 66 at the ends of the lower part 57. The elongated holes 67 when engaged by pins 61 allow a vertical play between parts 57 and 56 and also provide a hinge to separate the parts for purposes of repair or inspection (see dotted lines 57a of Fig. 8), or for the fast loading of sheets on production runs by a partial separation of the units.

The upper part 57 is spaced from the lower part 56 by set-screws 73 and is rigidly clamped in position by screws 74 passing freely through holes 63 (Fig. 17) and into tapped holes 68 (Fig. 8).

The parts 56 and 57 have cores 85 for lightening their weight and for containing a lubricant for the sheet 13. As best shown in Figs. 9, 17, 18 and 24, oil may be delivered from the cores 85 under pressure to oil holes 71 by backing out set-screw plugs 87, and through oil holes 65 when the screw plugs 88 are removed.

The purpose of the oil plugs 87 and 88 is to localize the oil flow laterally to the regions where the sheet metal 13 passes, since a variety of widths of sheets may be drawn. The cores 85 receive oil under pressure through a pipe fitting 86 which is connected to an oil pump by flexible means (not shown). Fig. 18 shows oil grooves 70 on the surface of guide plate 57 that lubricate the entire surfaces of the sheet as it passes between the parts 56 and 57.

The outer ends of the oil holes 65 in the construction shown in Fig. 24 are threaded to receive oil plugs 88 which when removed allow oil to flow through holes 89 and grooves 89a in inserts 80 and 81.

Fig. 9 shows the die D¹ adjusted so as to decrease the amount the sheet is bent over the working edge therein as it is being pulled through the die. This decreases the force acting to retard the movement of the sheet. In other words it decreases the drag on the sheet.

As has been previously stated, the change in the angular adjustment of the die D¹ and the die throat 82 increases or decreases the retarding force on sheet 13, which force is necessary in the longitudinal stretching and working of the sheet 13 between the throats 82 and 83. This retarding force is created at the discharge end of the throat 82 by virtue of the stiffness of the metal sheet 13 resisting deformation and is greater when the sheet is bent at a relatively sharper angle than when bent at a lesser angle. It has been found that the radius of the bend of the sheet at the throats may be as short as two to six times the thickness of the metal. However, larger radii may be desirable and still provide sufficient retarding force necessary to work the metal between die throats 82 and 83.

It has also been found that when the radius of curvature of the working edge of the die throat insert over which the sheet 13 bends is relatively large, the pressure per square inch of the sheet is relatively small and the danger of lubrication failure between the sheet and bending edge is reduced because the bending force created at a bend having a relatively large radius of curvature is less than over a sharper bend and also the metal being bent covers a larger area over which a smaller force is distributed. The radius of curvature of the bends of the sheet 13, however, is such that the sheet is stretched beyond its elastic limit. Details of different working edges and throat inserts will be described later.

The adjustment of the set-screws 73 and 74 to change the distance between the parts 56 and 57 and hence vary the pressure on the sheet 13 is another method of controlling this retarding force. However, in most cases, this practice is not desirable because the surfaces of the sheet would perhaps be damaged due to abrasion, and variations in the thickness of the metal would cause fluctuations of the retarding force. With the proper distance between the parts 56 and 57 a heavy grade of lubricating oil applied to the sheet as previously described may substantially increase the retarding force.

The guiding surfaces of the parts 56a and 57a (Fig. 4) may have curved complementary surfaces to increase the retarding force necessary for working sheets of certain physical characteristics.

In Figs. 9 and 11 is shown another auxiliary means for creating and applying a retarding force to the sheet 13. A guide bar 90 is supported at its ends by rotatable arms 93 which are pivoted on pins 94. The pins 94 are set in bosses 97 on the part 56. Adjustment of the bar 90 is had by moving clamping screws 96 which are threaded through lugs 95 on the rotatable arms 93 and engage the part 56. By moving the bar 90 upward, say to the position 90a (shown in dotted lines) the sheet 13 is forced to follow a path 13a (shown in dotted lines) in which path it engages the entering edge of upper part 57 at an angle. Likewise, the sheet 13 may be led under the guide bar 90 and the position of the guide bar 90 be adjusted to force the sheet against the entering edge of the part 56.

Still another means for applying a retarding force to the sheet 13 is shown in Fig. 16. To the trailing end of the sheet 13 is attached a clamp 98 which is connected to a rod 102 to which a retarding force may be applied by any well known means such as weights, springs, or friction blocks (not shown). Release of the sheet 13 may be automatically had as the end of the sheet approaches the die D¹ by mounting a bumper 100 and a set-screw 101 on the lower part 56 so that the tripping lever 99 of the clamp 98 strikes the screw 101 before the clamp 98 strikes the die D¹. The clamp 98 is carried by a slide 103, shown in dash and dot lines, which is slidably mounted on the bed 1a in a manner similar to the mounting of the slide 2.

It has been found in practice that the preferable method of regulating the retarding force applied to sheet 13 is the angular adjustment of the die D¹ which adjustment defines the angle at which the sheet 13 is bent over the working edge of the throat 82. Not only is the construction simple, but it is economical in sheet metal since the retarding force remains effective to the very end of the drawing of the sheet whereas with the use of the other retarding means the retarding effect diminishes or ceases when several inches of the end of the sheet still remain unworked behind the die throat 82.

The construction of the several forms of the second die and the working edges therein and the operating mechanism therefor will now be described.

As shown in Figs. 3, 5 and 8, there is provided a frame 104 which is rigidly fixed to the cross slide 30 by means of screws 110 passing through slots 111 in the cross slide 30 and by gibs 112 rigidly secured to the cross slide 30. The frame 104 has guides for push rods 117, 118, 119 and 120 and sleeves 121, 122, 123 and 124, and has heel extensions 108 and 109 engaging the discharge side of a second die D² to take up the longitudinal thrust exerted thereby, which is created by the deformation of the sheet 13 as it is drawn through the throat.

The frame 104 also takes up the thrust created at the guide surface 107 by the operation of the rigid throat release actuating mechanism described hereinafter.

C-shaped frames 113, 114, 115 and 116, mounted in planes at right angles to the direction of movement of the sheet, are rigidly secured at their lower ends to flanges on the push rods 117, 118, 119 and 120, respectively, and have secured to their upper ends sleeves 121, 122, 123 and 124, respectively, the push rods and sleeves being guided in holes 105 and 106, respectively, in frame 104. As best shown in Figs. 5 and 8 the upper ends of the push rods 117 to 120 inclusive are threaded for adjusting nuts 125.

The adjusting nuts 125 have at one end spherical surfaces 126 and 127 which are concentric. Piercing these spherical surfaces is a clearance hole 128 through which a shouldered screw 129 may concentrically pivot against surface 127 of nut 125 by virtue of its spherical surface 130. The shoulder 131 of the screw 129 rests tightly on a swivel nut 132 also having a spherical surface 133 concentric with surface 126 of nut 125. A sliding clearance is provided between the surfaces 130 and 133 for the swivel action of the nut 132 which has a threaded end 134 for screwing into a supporting dovetail grooved block 135. The dovetail groove of the block 135 supports and slides on the outer dovetailed flexible strip 136 which supports the die throat working elements 137 and 138 of which several types will be described later in connection with Figs. 22, 23, 24 and 33.

The upper flexible die throat working element 138 is supported in a manner similar to that of the lower element 137 just described. The swivel nuts 132a have their threaded ends screwed into supporting dovetail grooved block 135a and the adjusting nuts 125a are screwed onto the lower threaded extremity of stems 139, 140, 141 and 142, respectively, which are mounted with a sliding fit in sleeves 121, 122, 123 and 124, respectively.

Directly above sleeves 121 to 124, inclusive, are bent extensions 143 having pivot pins 144 therein and having V-shaped clearance stops 145. The upper extremities of the stems 139 to 142, inclusive, are also provided with pivoting pins 146. Toggle links 147 and 148 are pivotally connected together by pins 149. Links 147 are pivotally connected to pins 144 and links 148 are pivotally connected to pins 146. The pins 149 extend laterally from the sides of toggle links 148 and fit slidably into vertical slots 150 in actuating bars 151. The actuating bars 151 slide on the surfaces 107 of the framework 104 and may be operated manually or by any other well known means. Fig. 6 shows one extremity of bars 151 being connected to a flanged piston rod 152 of a hydraulic double acting cylinder 153 for producing the necessary movement of bars 151. Fig. 5 shows the links 147 and 148 in their extended or working positions with the pins 149 resting against the stop surfaces 145. In this condition, the toggle links 147 and 148 rigidly hold stems 139 to 142, inclusive, in the lowered position relative to the sleeves 121 to 124, inclusive, thus rigidly supporting the upper flexible die throat supporting member 138 in constant spaced relation to the lower flexible die throat supporting member 137.

In loading a new sheet 13 for delivery to the jaws of the clamp 10, the gap between the flexible die throat members should be opened for quick and easy passage of the sheet to the clamps 10. This is accomplished by the hydraulic piston 152, or other means, moving actuating bars 151 so that pins 149 force the toggle links 147 and 148 to collapse and thereby raise the stems 139, 140, 141 and 142. The slots 150 allow for a uniformly spaced gap to be opened between the flexible die throat members 137 and 138, regardless of the curve that these units may be forced to assume by the independent action of the adjustable cams 16 to 23, inclusive.

At the base of push rods 117, 118, 119 and 120, rollers 154 are mounted which ride on the adjustable surfaces, respectively, of the cams 16 to 23, inclusive. Contact with these surfaces is assured by compression springs 155 inserted between flange extensions 156 on the push rods 117, 118, 119 and 120 and the upper ends of spring pockets 157 in the frame 104.

The adjustable cams 16 to 23, inclusive, are for the purpose of moving to the desired instantaneous positions the various stations of the die throat 83 relative to the corresponding stations of die throat 82. By the individual adjustment of these cam surfaces an infinite variety of shapes may be produced and duplicated economically for either individual or mass production. Furthermore, once each cam is set according to calculations or set to positions determined from graphs or tables for a particular material and shape, the setting of the cams to repeat the shape at some future time is easily accomplished by keeping records of positions of the cam setting screws of each production run. My apparatus may be supplied with two or more sets of cams 16 to 23, inclusive, and adjusting screws so that one set may be adjusted to produce a certain shape of drawn sheets while the machine is being used to produce another shape of drawn sheets. Each cam may be adjusted by graduations from predetermined figures or by matching the profile of the cam to a predetermined paper graph. In making such adjustments each cam or set of cams may be in position in the machine or they may be on a bench nearby. By this method, interruptions in the constant flow of production by the machine is reduced to a minimum, since the sets of cams 16 to 23, inclusive, may be interchanged in a few minutes.

The heights of the working surfaces 158 of the cams are adjusted by setting the positions of the adjusting set-screws 160. As best shown in enlarged view Fig. 29, the set-screws 160 are retained at one end by a dovetailed block 161 which fits into the lower dovetail grooved flexible blade 162 which together with other component blades 163 and 164 form a flexible but settable cam, the working surfaces 158 of which operate the flexible throat push rods. Since the surfaces 158 at times assume inclined curved surfaces, the adjusting screws to be always normal to this surface at the point of contact with the blade 162 must be able to pivot about a point of support. Threaded swivel blocks 165, provided for this purpose, are pivotally held by pins 166 set in pockets of an H-shaped cam frame 167. The screws 160 are turned by inserting a wrench in hexagonal sockets 168 in their lower ends.

Figs. 29, 30 and 31 show an adjustable cam arrangement with its surface 158 having along its longitudinal central portion a second or auxiliary working surface 159 which surface is independently adjustable relative to the surface 158 by screws 159a and 159b so that relative motions of pairs of push rods may be obtained from the two surfaces. The purpose of this action will be described later.

Figs. 11, 12 and 15 show the principal elements of one embodiment of my invention just described, but in these figures is disclosed a simplified arrangement for adjusting the positions of the various stations of the adjustable second die throat 83. The forming elements of die throat 83 are similar to those shown in Figs. 3, 5 and 8, and they are adjustable by nuts 125 which are screwed to studs 169. The studs 169 are spaced similarly to the push rods 117 to 120, inclusive, but are held rigidly in an interchangeable lower adapter 170 and an interchangeable upper ram 171. The adjusting nuts 125 in this case serve to produce the desired contour of the die throat 83, as best viewed in Fig. 12.

The lower adapter 170 is rigidly fixed to the cross slide 30. The upper ram 171 is slidably mounted on the cross slide 30 and is held in place by gibs 112. Vertical sliding motion of the ram 171 is obtained by pivotally connected toggle links 172, 173 and 174. The lower links 172 have their lower ends pivotally connected to the ends of the ram 171 and have their upper ends pivotally connected to the toggle links 173 and 174, respectively. The pivoting points of the toggle links are connected by a tie-bar 175 in order to produce related motion of the two sets of toggles.

The upper pivoting points of links 173 and 174 are pivotally supported by adjustable brackets 177 and 178, respectively, which are fastened to the uprights of the cross slide 30 by screws 110 which pass through slots 111 in the cross slide 30. Screws 179 in the upper ends of the uprights of the cross slide 30 rigidly locate the proper height of ram 171 when the toggle links 172 and 173 and 174 are in line position.

At the bottom of the ends of ram 171, surfaces are provided to contact adjustable stop screws 180 supported at the ends of the adapter 170 for the purpose of maintaining the proper clearance in the die throat 83.

To load a sheet 13 in the machine and to clamp it by the jaws 12 (Fig. 8), the ram is lifted by collapsing the toggle links 172, 173 and 174 from an in-line position (Fig. 12) to a position such as shown in Fig. 13. The links 173 may be provided with an extension arm 173a for inserting a handle similar to socket handle 38 (Fig. 3) for manually operating the ram. The ram may also be mechanically or hydraulically operated by providing the link 174 with an extension arm 176 shown in dotted lines in Fig. 12 and moving it by a hydraulic piston in a cylinder 184, shown in dotted lines.

Referring particularly to Fig. 12, the cross slide 30 is moved transversely by a cam unit similar to cam 25 previously described. A cam plate 26 is slidably supported by the base 1, as is the cam plate 25, and carries an adjustable cam track 182 which is engaged by rollers 181. The rollers 181 are carried by an extension 181a which extends outwardly from the cross slide 30.

The effect of moving the cross slide 30 during the drawing of the sheet 13 through the machine and with the slide 32 stationary throughout the draw, is to shift the areas of maximum and minimum stretch laterally in accordance with the relative lateral movement of the cross slide 30.

In Fig. 42 is illustrated the product of such a method of drawing a sheet. Without the lateral shifting of the cross slide 30 during the draw, the high longitudinal section of the sheet, or where the metal has been stretched the most, would have followed the center line B of the sheet, but by shifting the cross slide laterally first to one side and then to the other side of the center line of the machine, the high section of the sheet has been shifted to one side of the center line of the sheet and then to the other side, as indicated by the line A. Complicated or difficult shapes are thus formed by the cross slide action of the second die $D^2$. It is at once obvious that further complicated shapes may be formed by simultaneously moving the slide 32 during the draw.

In Figs. 19 and 20 is shown another modification of my apparatus of the pulsating second die throat type. The differences between the construction shown in these figures and that shown in Figs. 3, 5 and 8 are that the die throat 83 receives positive movements of its lower forming element by cam action already described in connection with Figs. 3, 5 and 8, but the upper forming element is provided with spring take-ups and the sheet 13 itself determines the separation between the working edges and the guide surfaces within the die throat 83.

Referring to Figs. 19 and 20, the toggle links 172, 173 and 174 support a ram 185 which is guided, adjusted and lifted similarly to ram 171 previously described. The ram 185 contains bores for plungers 186 and springs 187. The compressional forces exerted by springs 187 are adjusted by threaded plugs 188. The plungers 186 support the flexible die throat supporting member 138 as has been described in other cases. The push rods 189, 190, 191 and 192 are moved by cams in the same manner as push rods 117, 118, 119 and 120 (Fig. 5).

In practice it has been found unnecessary to provide guide blocks to keep the sheet from moving laterally during the draw when there is no cross motion of the cross slide 30 or when the sheet is in the form of a rectangle.

One construction for guiding the sheet 13 having parallel sides against sidewise movement is illustrated in Figs. 9 and 11. Guide blocks 91 are positioned along the guide bar 90 and fixed in position on bar 90 by set-screws 92.

When the sheets to be drawn are trimmed blanks of a symmetrical form and guiding is necessary, adjustable guide blocks are provided, as shown in Fig. 14. Two guide blocks 193 are slidably mounted on a support bar 194. These blocks are clamped to a cable 195 by screws 196. The cable 195 runs over pulleys 197 at the ends of bar 194 which pulleys are forced under the tension of springs (not shown) outwardly which creates a tendency to bring guide blocks 193 towards the center of sheet 13.

As previously stated, the effect of stretching unequally the various longitudinal portions of the sheet is to increase the areas of certain portions and by controlling the stretching in the sheet throughout its thickness after the areas have been formed by stretching between the stretching throats a proportional part of the effect of increased areas is controlled to cause a longitudinal curvature and the remainder of the effect of increased area will manifest itself in a transverse curvature.

Referring particularly to the enlarged view of my second die throat in Figs. 22, 23 and 24, the second throat 83 is provided with an auxiliary curvature control working edge (see the head of arrow 212, Fig. 22) to subject the sheet 13 to a reverse bending after it has passed over the last longitudinal stretching working edge (see the head of arrow 211). As illustrated in Fig. 22, the curvature control working edge is integral with guide plate 138, the other purpose of which is to keep the sheet 13 in proper relation with the working edge (at arrow 211) on member 137. It will of course be obvious that the left portion of member 137 forms the guide plate on the opposite side of the sheet 13 as it passes over the curvature control working edge.

The reverse bending of the sheet to control the curvature of the sheet may also be applied by providing replaceable die throat working edge elements of the form shown as 137a and 138b and guide plate elements 138a and 137b as illustrated in Fig. 23, or by providing an independently movable curvature control throat 83b. In the latter type, the throat may be statically adjusted in position relative to the other throat by push rods connected into threaded holes 134 at the various stations along the blade 135, as illustrated in Fig. 22 or the two throats may be dynamically adjusted in position relative to each other as provided for in the construction illustrated in Figs. 29, 30, 31, 32 and 33.

In Figs. 29, 30 and 31, the upper cam blade 164, the upper surface 158 of which is the working cam surface for the push rod 120 (Fig. 8) or the push rod 192 (Fig. 20), has a central longitudinal groove therein in which loosely fits a flexible cam 159, the upper surface 159a of which is the working surface that is in contact with the roller 154a. The roller 154a is mounted in an extension 156a to which is secured the push rod 192a which is in all respects similar to push rod 192 in Fig. 20. The push rod 192a is connected to the lower element of a third die throat 83a (as in Fig. 33) or to the curvature control die throat 83b (as in Fig. 24). The roller 154a is held in contact with the surface 159 by springs 155a which engage the extension 156a and the upper ends of spring pockets 157a in the frame 104a. The cam 159 is adjusted and held in position relative to blade 164 by screws 159b and 159c.

In Fig. 32 is shown a modification of the arrangement disclosed in Figs. 29, 30 and 31 wherein the roller 154 is shown as being held against the surface 158 by a spring 155 acting against an extension 156b which corresponds to the extension 156 in Figs. 30 and 31. In this construction a push rod 192a passes freely through the extension 156b and is secured to an extension 156c which carries a roller 154a. A spring 155c is interposed between pockets in the extension 156b and the extension 156c.

In Fig. 33 is shown a further modification of die throats wherein relative motion between die throats 83 and 83a is obtained by a single roller 154 in contact with a single cam surface 158. As shown in this figure the push rod 192 extends freely through a lip 198 on the frame 104 and frame 199 attached thereto and is secured to an extension 156d. A projection 203 on the push rod 192 contacts the shaft 201 of the roller 154 which is journaled in a link 202. The extension 156d is forced downward by the spring 155 which is in contact with the extension 156d and frame 199.

A push rod 192a passes freely through the frame 199, lip 198 and extension 156d and is attached to an extension 156e on the lower end of which is a projection 203 which is pivoted on one end of the link 202. The other end of the link 202 is pivotally connected to the frame 199. The extension 156e is forced downward by the spring 155a engaging the extension 156e and the extension 156d. The extension 108 is moved vertically in accordance with the motion of the extension 156d by a rod 204 which passes freely through the frame 199 and lip 198 and is in contact at its lower end with the extension 156d and at its upper end with the extension 108.

The upper halves of the throats 83 and 83a are held in contact with the sheet 13 by springs. The adjusting nut 125 engages a screw 205 which is secured into a block 206. The block 206 moves vertically in an extension on the frame 104 and is forced downward under the action of the spring 187 which engages the frame 104 and the block 206. An adjusting nut 125a engages the lower end of a threaded rod 207 which extends freely through a hole 208 in the block 206 and a hole in an exteriorly threaded plug 188. The upper portion of the hole 208 is enlarged and threaded at 208a and is in engagement with the plug 188. The rod 207 is forced downward by a spring 187a which engages the plug 188 and a shoulder 208b on the rod 207.

It will be noted in Fig. 33 that the auxiliary throat 83a is shaped similar to the second throat shown in Fig. 22 in which figure the arrows 209, 210, 211 and 212 indicate the directions of the reactive forces set up by the working of the sheet against the several areas of the surfaces of the throats. The arrow 209 indicates the direction of reaction of the resistance to bending of the sheet 13 as it is about to pass over the working edge of the first throat; arrow 210 indicates the direction of reaction as the sheet is worked over the working edge of the first throat; arrow 211 indicates the direction of reaction as the sheet is worked over the working edge of the second throat; and arrow 212 indicates the direction of reaction as the sheet is bent (in a direction reverse to that when passing over the working edge of the second throat) to control the ultimate curvature of the sheet in free space after the sheet has been drawn through the machine.

From the preceding paragraph it is obvious that the three throats shown in Fig. 33 provide five working edges, one in throat 82, two in throat 83 and two in throat 83a. It is of course obvious that other shapes of throats may be used to work the metal into forms of particular longitudinal and transverse curvatures as may be required.

In Figs. 22 and 23 the curvature control working edge is shown as being spaced a fixed distance from the last stretching working edge. In forming some curvatures it has been found practical to have the two working edges parallel to each other and a fixed distance apart, the effect of the curvature control working edge being controlled by selecting throat assemblies having different degrees of sharpness of the curvature control working edge and at different distances from the last stretching working edge. As previously stated the curvature fixing throat may be statically or dynamically moved in position relative to the last stretching throat. The relative movement is illustrated as vertical, but it is of course obvious that the relative movement may be horizontal, using the mechanisms similar to those illustrated in Figs. 29, 30 and 31 and with the well known bell crank levers.

Referring to Fig. 24, when the curvature control working edge and the second stretching working edge are moved uniformly away from or towards each other as the sheet is drawn through the machine, that is, the distances between corresponding stations of both edges are uniformly increased or decreased, there will occur an incidental increase or decrease in the stretching in the longitudinal portions which will be independent of the unequal stretching of the longitudinal portions due to the differences in curvatures of the two stretching working edges. Whether this incidental stretching is uniform transversely of the sheet will be determined by the uniformity of the distances between corresponding stations of the two edges. When the curvature control working edge and the second stretching working edge are moved nonuniformly to each other, the incidental stretching will be non-uniform transversely of the sheet. The effect of this incidental stretching is taken into consideration in setting the flexible cams that determine the relative motion between such edges. Advantage is taken of this effect to obtain particular results such as, for example, a sheet that changes in curvature abruptly along its length from a predominating transverse curve to a predominating longitudinal curve or that changes from a longitudinal or transverse curvature in one direction to a curvature in the opposite direction.

Referring to Fig. 21 there is shown therein the form that the sheet 13 assumes as it is being drawn through a machine having first and second throats arranged as shown in Fig. 22. The sheet 13 at station Z—Z' is flat, as the section of the sheet 13 at that station has not been subject to any stretching. The sheet 13 at station Y—Y' is being worked over the working edge of the first throat (arrow 210, Fig. 22) of a sharpness or having a radius of curvature as dictated by the thickness and physical characteristics of the metal. The sheet 13 at station X—X' is being worked over the working edge of the second throat (arrow 211) and it is being unequally stretched longitudinally between stations Y—Y' and X—X' as indicated by the differences in length of longitudinal lines X—Y, M—N, U—V, M'—N' and X'—Y'. The sheet at station W—W' is passing over the curvature control edge (arrow 212) where the final curvature of the sheet is fixed.

It has been found in drawing sheets of metal through my machine that when one longitudinal portion (say, the central portion) is being stretched, reactions are set up in other longitudinal portions (near the edges) due to the metal in the portions adjusting itself to the drawing conditions of the central longitudinal portion being extended in area but with the front edge of the central portion of the sheet being moved forward at the same rate as the edge portions. There is therefore a tendency under those conditions for the edge portions between the stretching throats to be formed into waves. To overcome this tendency, the surfaces adjacent the stretching working edges (see Figs. 22, 24 and 23) are extended to form a confined passage for the sheet so that such portions of the sheet under such drawing conditions are compressed. This permits of obtaining extreme curvatures by conservative stretching because the effect of the compression in one longitudinal portion is additive to the effect of stretching in another longitudinal portion.

It is of course understood that various modifications of my invention will be apparent to those skilled in the art in the adaptation of my invention to particular problems in sheet forming that come within the scope of the appended claims.

I claim:

1. In a sheet metal working apparatus for imparting transverse and longitudinal curvatures to a sheet, a pair of slotted dies through which the sheet is successively pulled and which have each a working edge, the said working edges being of substantially different longitudinal contour and disposed in stepped relation with respect to the movement of the sheet and arranged to direct the sheet as it is pulled through the dies so that the sheet is successively engaged on opposite faces by the working edges and is abruptly bent over the working edges first in one direction and then in the reverse direction and retarding means operative to engage the sheet ahead of the dies and impose a drag upon it, whereby the sheet is differentially stretched throughout its width as it is pulled through the dies.

2. In a sheet metal working apparatus for imparting transverse and longitudinal curvatures to a sheet, a pair of slotted dies through which the sheet is successively pulled and which have each a working edge, the said working edges being of substantially different longitudinal contour and disposed in stepped relation with respect to the movement of the sheet and arranged to successively engage the sheet on opposite faces and cooperative to bend the sheet abruptly in first one direction and then in the reverse direction, means immediately associated with the working edges for directing and constraining the sheet to said engagement with the working edges as the sheet is pulled through the dies and retarding means operative to engage the sheet ahead of the dies and impose a drag upon it, whereby the sheet is differentially stretched throughout its width as it is pulled through the dies.

3. In a sheet metal working apparatus for imparting transverse and longitudinal curvatures to a sheet, a plurality of slotted dies through which the sheet is successively pulled and which have each a working edge, said working edges being in stepped relation and of substantially different longitudinal contour and arranged to successively engage opposite faces of the sheet as it is pulled through said dies, one of said dies being mounted for angular adjustment about an axis substantially coincident with the working edge therein, and means for effecting said adjustment whereby the angle at which the sheet is pulled over the working edge is changed and the resistance acting to effect a drag upon the sheet which is created by drawing the sheet over the working edge is varied.

4. In a sheet metal working apparatus for imparting transverse and longitudinal curvatures to a sheet, a pair of adjustably mounted slotted dies through which the sheet is successively pulled and which have each a working edge, the said working edges being of substantially different longitudinal contour and disposed in stepped relation with respect to the movement of the sheet and arranged to successively engage the sheet on opposite faces and cooperative to bend the sheet abruptly in first one direction and then in the reverse direction, means for changing the relative position of said dies with respect to each other while the sheet is being pulled through said dies and retarding means operative to engage the sheet ahead of the dies and impose a drag upon it, whereby the sheet is differentially stretched throughout its width as it is pulled through the dies.

5. In a sheet metal working apparatus for imparting transverse and longitudinal curvatures to a sheet, a pair of adjustably mounted slotted dies through which the sheet is successively pulled and which have each a working edge, the said working edges being of substantially different longitudinal contour and disposed in stepped relation with respect to the movement of the sheet and arranged to successively engage the sheet on opposite faces and cooperative to bend the sheet abruptly in first one direction and then in the reverse direction, means cooperating with the first die to exert a drag upon the sheet, and means for moving one of said dies in the direction of movement of the sheet while the sheet is being pulled through said dies.

6. In a sheet metal working apparatus for imparting transverse and longitudinal curvatures to a sheet, a pair of adjustably mounted slotted dies through which the sheet is successively pulled and which have each a working edge, the said working edges being of substantially different longitudinal contour and disposed in stepped relation with respect to the movement of the sheet and arranged to successively engage the sheet on opposite faces and cooperative to bend the sheet abruptly in first one direction and then in the reverse direction, means for moving one of said dies laterally with respect to the movement of the sheet while the sheet is being pulled through said dies and retarding means operative to engage the sheet ahead of the dies and impose a drag upon it, whereby the sheet is differentially stretched throughout its width as it is pulled through the dies.

7. In a sheet metal working apparatus for imparting transverse and longitudinal curvatures to a sheet, a pair of adjustably mounted slotted dies through which the sheet is successively pulled and which have each a working edge, the said working edges being of substantially different longitudinal contour and disposed in stepped relation with respect to the movement of the sheet and arranged to successively engage the sheet on opposite faces and cooperative to bend the sheet abruptly in first one direction and then in the reverse direction, means for moving one of said dies in a direction perpendicular to the movement of the sheet while the sheet is being pulled through said dies and retarding means operative to engage the sheet ahead of the dies and impose a drag upon it, whereby the sheet is differentially stretched throughout its width as it is pulled through the dies.

8. In a sheet metal working apparatus for imparting transverse and longitudinal curvatures to a sheet, a plurality of slotted dies through which the sheet is successively pulled and which have each a working edge, said working edges being of substantially different longitudinal contour and arranged to successively engage opposite faces of the sheet as it is pulled through said dies, one of said dies being mounted for angular adjustment about an axis substantially coincident with the working edge therein and for linear movement in the direction of movement of the sheet, means for effecting said angular adjustment, and means for effecting said linear movement as the sheet is pulled through said dies.

9. In a sheet metal working apparatus for imparting transverse and longitudinal curvatures to a sheet, a plurality of adjustably mounted slotted dies through which the sheet is successively pulled and which have each a working edge, the said working edges being of substantially different longitudinal contour and disposed in stepped relation with respect to the movement of the sheet and arranged to successively engage the sheet on opposite faces and cooperative to bend the sheet abruptly in first one direction and then in the reverse direction, means for moving one of said dies in the direction of movement of the sheet, means for moving other of said dies laterally to and perpendicularly to the movement of the sheet while the sheet is being pulled through said dies and retarding means operative to engage the sheet ahead of the dies and impose a drag upon it, whereby the sheet is differentially stretched throughout its width as it is pulled through the dies.

10. In a sheet metal working apparatus for imparting transverse and longitudinal curvatures to a sheet, a pair of slotted dies through which the sheet is successively pulled and which have each a working edge, the said working edges being of substantially different longitudinal contour and disposed in stepped relation with respect to the movement of the sheet and arranged to successively engage the sheet on opposite faces and cooperative to bend the sheet abruptly in first one direction and then in the reverse direction, and means engaging the sheet and coacting with the first working edge to exert a drag on the sheet as it is pulled through the dies.

11. In a sheet metal working apparatus for imparting transverse and longitudinal curvatures to a sheet, a pair of dies in stepped relation to each other through which the sheet is successively pulled and which have each a non-rotatable working edge, the working edge in the first die being non-deformable and the working edge in the other die being deformable, and means for changing the geometrical shape of the deformable working edge while the sheet is being pulled through said dies.

12. In a sheet metal working apparatus for imparting transverse and longitudinal curvatures to a sheet, a pair of adjustably mounted slotted dies in stepped relation to each other through which the sheet is successively pulled and which have each a non-rotatable working edge, the working edge in the first die being non-deformable and the working edge in the other die being deformable, means for changing the geometrical shape of the deformable working edge, and means for changing the relative position of said dies with respect to each other while the sheet is being pulled through said dies.

13. In a sheet metal working apparatus for imparting transverse and longitudinal curvatures to a sheet, a pair of adjustably mounted slotted dies in stepped relation to each other through which the sheet is successively pulled and which have each a non-rotatable working edge, the working edge in the first die being non-deformable and the working edge in the other die being deformable, means for changing the geometrical shape of the deformable working edge, and means for moving the said other die laterally to the movement of the sheet as the sheet is being pulled through said dies.

14. In a sheet metal working apparatus for imparting transverse and longitudinal curvatures to a sheet, a pair of slotted dies in stepped relation to each other through which the sheet is successively pulled, the first die having a straight non-deformable working edge therein and being mounted for angular adjustment about an axis substantially coincident with the working edge therein, the other of said dies having a deformable working edge therein and being mounted for lateral movement with respect to the movement of the sheet, means for effecting said angular adjustment of the first die, means for changing the geometrical shape of said deformable working edge, and means for moving said other die laterally.

15. In a sheet metal working apparatus for imparting transverse and longitudinal curvatures to a sheet, a pair of slotted dies through which the sheet is successively pulled, the first die having a straight non-deformable working edge therein and being mounted for angular adjustment about an axis substantially coincident with the working edge therein, and for linear movement in the direction of movement of the sheet, the other of said dies having a deformable working edge therein and being mounted for lateral movement with respect to the movement of the sheet, means for effecting said angular adjustment of the first die, means for effecting the said linear movement of the first die, means for changing the geometrical shape of said deformable working edge and means for moving said other die laterally.

16. In a sheet metal working apparatus for imparting transverse and longitudinal curvatures to a sheet, a plurality of slotted dies through which the sheet is successively pulled, a straight working edge in the first die, a working edge of different geometrical shape in each of the other dies, the said working edges being disposed in stepped relation with respect to the movement of the sheet and arranged to successively engage the sheet on opposite faces and cooperative to bend the sheet abruptly in first one direction and then in the reverse direction, and means immediately associated with the working edges for directing and constraining the sheet to said engagement with the working edges as the sheet is pulled through the dies.

17. In a sheet metal working apparatus for imparting transverse and longitudinal curvatures to a sheet, a plurality of slotted dies through which the sheet is successively pulled, the first die having a straight working edge therein and being mounted for angular adjustment about an axis substantially coincident with the working edg edge, a working edge of different geometrical shape in each of the other dies, the said working edges being disposed in stepped relation with respect to the movement of the sheet and arranged to successively engage the sheet on opposite faces and cooperative to bend the sheet abruptly in first one direction and then in the reverse direction, and means immediately associated with the working edges for directing and constraining the sheet to said engagement with the working edges as the sheet is pulled through the dies.

18. In a sheet metal working apparatus for imparting transverse and longitudinal curvatures to a sheet, a pair of slotted dies through which the sheet is successively pulled and which have each a working edge at least one of which is curved transversely to the movement of the sheet, the said working edges being disposed in stepped relation with respect to the movement of the sheet and engaging opposite faces of the sheet and cooperative to cause abrupt changes in direction of the sheet, whereby the sheet is longitudinally stretched a varying amount transversely of the sheet and a compound curvature is thereby imparted to it, and means beyond the last working edge frictionally engaging the face of the sheet opposite that engaged by the last working edge and functioning to stretch the surface of the sheet engaged by the last working edge and thereby modify the inherent longitudinal curvature.

19. In a sheet metal working apparatus for imparting transverse and longitudinal curvatures to a sheet, a pair of slotted dies through which the sheet is successively pulled and which have each a working edge at least one of which is curved transversely to the movement of the sheet, the said working edges being disposed in stepped relation with respect to the movement of the sheet and engaging opposite faces of the sheet and cooperative to cause abrupt changes in direction of the sheet, whereby the sheet is longitudinally stretched a varying amount transversely of the sheet and a compound curvature is thereby imparted to it, and means beyond the last working edge substantially conforming in contour to the last working edge and frictionally engaging the face of the sheet opposite that engaged by the last working edge and functioning to stretch the surface of the sheet engaged by the last working edge and thereby modify the inherent longitudinal curvature.

20. In a sheet metal working apparatus for imparting transverse and longitudinal curvatures to a sheet, a pair of slotted dies through which the sheet is successively pulled and which have each a working edge at least one of which is curved transversely to the movement of the sheet, the said working edges being disposed in stepped relation with respect to the movement of the sheet and engaging opposite faces of the sheet and cooperative to cause abrupt changes in direction of the sheet, whereby the sheet is longitudinally stretched a varying amount transversely of the sheet and a compound curvature is thereby imparted to it, and means beyond the last working edge substantially conforming in contour to the last working edge and frictionally engaging the face of the sheet opposite that engaged by the last working edge and functioning to stretch the surface of the sheet engaged by the last working edge, whereby control of both the longitudinal and transverse curvatures is effected.

21. In a sheet metal working apparatus for imparting transverse and longitudinal curvatures to a sheet, a pair of slotted dies through which the sheet is successively pulled, the first die having a non-deformable working edge therein and being mounted for angular adjustment about an axis transverse to the movement of the sheet and for linear movement in the direction of movement of the sheet, the other die having a deformable working edge therein and being mounted for movement in directions laterally to and perpendicularly to the movement of the sheet, means for effecting said angular adjustment of the first die, means for effecting said linear movement of the first die, means for changing the geometrical shape of the deformable working edge, means for effecting said lateral movement of said other die and means for effecting said perpendicular movement of said other die.

22. In a sheet metal working apparatus for imparting transverse and longitudinal curvatures to a sheet, a pair of slotted dies through which the sheet is successively pulled, the first die having a non-deformable working edge therein and being mounted for angular adjustment about an axis transverse to the movement of the sheet and for linear movement in the direction of movement of the sheet, the other die having a deformable working edge therein and being mounted for movement in directions laterally to and perpendicularly to the movement of the sheet, means for engaging and pulling a sheet through said dies and over said working edges, means for effecting said angular adjustment of the first die, means for effecting said linear movement of the first die, means for changing the geometrical shape of the deformable working edge, means for effecting said lateral movement of said other die and means for effecting said perpendicular movement of said other die, the means for effecting the angular and linear movement of the first die and the means for changing the geometrical shape and for effecting lateral and perpendicular movement of the other die being secured to said sheet engaging and pulling means and moved thereby in timed relation to the movement of the sheet.

23. In a device for forming longitudinally and transversely curved sheets, the combination of an elongated flexible forming element, means for flexing said forming element into a longitudinally bowed form, a second forming element having a straight forming surface adjacent to said flexible forming element, means for moving said second forming element into overlapping relationship with said flexible forming element and means for drawing a sheet of metal successively over said straight forming surface and said flexible forming element at such an angle as to cause said sheet to engage said surface and said element and be bent and stretched thereby to impart a longitudinal and transverse curvature to said sheet.

24. In a device for forming longitudinally and transversely curved sheets, the combination of an elongated flexible forming element, means for flexing said forming element into a longitudinally bowed form, a second substantially straight elongated forming element adjacent to said flexible forming element, means for moving said forming elements relatively into and out of overlapping relationship and means for drawing a sheet of metal successively over said forming elements at substantially right angles to the longitudinal axes thereof and at such an angle as to cause said sheet to engage said forming elements and be bent and stretched thereby.

25. The device set forth in claim 24 in which the means for flexing the flexible forming element comprises a cam and the means for moving said forming elements relatively comprises a toggle.

26. In a device for forming longitudinally and transversely curved sheets, the combination of an elongated flexible forming element, means for flexing said forming element into a longitudinally bowed form, a second forming element having a straight forming surface adjacent to said flexible forming element, means for relatively moving said second forming element into overlapping relationship with said flexible forming element and means for drawing a sheet of metal successively over said straight forming surface and said flexible forming element at such an angle as to cause said sheet to engage said surface and said element and be bent and stretched thereby to impart a longitudinal and transverse curvature to said sheet.

27. A die unit for imparting transverse and longitudinal curvatures to a sheet comprising two dies with an opposing guide block for each die together forming a pair of die throats including working edges therein disposed transversely of the movement of the sheet and adapted to permit a sheet to be drawn therethrough, the two throats being of different contour and in parallel planes and at least one of them being longitudinally curved, the said throats being positioned in stepped relation to each other and sufficiently close to cause abrupt changes in direction of the sheet, whereby the said sheet is bent and stretched when drawn over said working edges and between said throats, and means adapted to exert a lateral concentrated force on one face of said sheet after it has passed through the last throat, whereby the other face of said sheet is elongated and unequal stresses on the faces of the sheet are equalized.

28. A die unit for imparting transverse and longitudinal curvatures to a sheet comprising two dies with an opposing guide block for each die together for forming a pair of die throats including working edges therein disposed transversely of the movement of the sheet and adapted to permit a sheet to be drawn therethrough, the two throats being of different contour and at least one of them being longitudinally curved, the said throats being positioned in stepped relation to each other and sufficiently close to cause abrupt changes in direction of the sheet, whereby the sheet is longitudinally stretched a varying amount transversely of the sheet and is unequally elongated throughout its thickness and a compound curvature is thereby imparted to it, and a die having a working edge beyond the last throat of the same contour as the working edge of the last throat and disposed in a plane parallel to that of the working edge of the last throat and engaging the side of the sheet opposite that engaged by the said last working edge and functioning to stretch the face of the sheet engaged by said last working edge and thereby modify the inherent longitudinal curvature.

29. A die unit for imparting transverse and longitudinal curvatures to a sheet comprising two dies with an opposing guide block for each die together forming a pair of die throats including working edges therein disposed transversely of the movement of the sheet and adapted to permit a sheet to be drawn therethrough, the two throats being of different contour and at least one of them being longitudinally curved, the said throats being positioned in stepped relation to each other and sufficiently close to cause abrupt changes in direction of the sheet, whereby the sheet is longitudinally stretched a varying amount transversely of the sheet and is unequally elongated throughout its thickness and a compound curvature is thereby imparted to it, and a die having a working edge beyond the last throat substantially conforming in contour to the said last working edge disposed in a plane parallel to that of the last working edge and engaging the face of the sheet opposite that engaged by the said last working edge and functioning to stretch the face of the sheet engaged by said last working edge and thereby modify the inherent longitudinal curvature.

30. A die unit for imparting transverse and longitudinal curvatures to a sheet comprising two dies with an opposing guide block for each die together forming a pair of die throats including working edges therein disposed transversely of the movement of the sheet and adapted to permit a sheet to be drawn therethrough, the two throats being of different contour, the said throats being positioned in stepped relation to each other and sufficiently close to cause abrupt changes in direction of the sheet, whereby the sheet is longitudinally stretched a varying amount transversely of the sheet and is unequally elongated throughout its thickness and a compound curvature is thereby imparted to it, and a die beyond the last throat having a working edge substantially conforming in contour to the said last working edge disposed in a plane parallel to that of the last working edge and engaging the face of the sheet opposite that engaged by the last working edge and positioned in stepped relation to said last working edge so as to stretch the face of the sheet opposite to that which it engages, whereby control of both the longitudinal and transverse curvatures is effected.

31. Apparatus for shaping sheet metal comprising, in combination with means for pulling the sheet edgewise, two die members with an opposing complementary guide block for each die member together forming a pair of die throats including working edges therein of different contour disposed transversely of the movement of the sheet in parallel planes and adapted to permit a sheet to be drawn therethrough and at least one of which throats is longitudinally curved, the said throats being positioned in stepped relation to each other and one of the die members being adjustable toward and from the transverse plane including the other die member, and means to effect said adjustment.

32. Apparatus for shaping sheet metal comprising, in combination with means for pulling the sheet edgewise, two die members with an opposing complementary guide block for each die member together forming a pair of die throats including working edges therein disposed transversely of the movement of the sheet and adapted to permit a sheet to be drawn therethrough and at least one of which throats is longitudinally curved, the said throats being positioned in stepped relation to each other and one of the die members being adjustable toward and from the transverse plane including the other die member, and cam means operatively coupled to the adjustable die member and active to adjust the adjustable die member during the pulling of the sheet.

FROHMAN ANDERSON.

REFERENCES CITED

The following references are of record in the file of this patent:

UNITED STATES PATENTS

| Number | Name | Date |
|---|---|---|
| 1,142,242 | Ellis | June 8, 1915 |
| 1,459,660 | Felten | June 19, 1923 |
| 1,588,817 | Smith | June 15, 1926 |
| 1,608,910 | Sjolander | Nov. 30, 1926 |
| 1,753,586 | Warwick | Apr. 8, 1930 |
| 1,767,289 | Kellogg | June 24, 1930 |
| 1,773,459 | Kellogg | Aug. 19, 1930 |
| 1,823,489 | Ridder | Sept. 15, 1931 |
| 2,251,901 | Cairns | Aug. 5, 1941 |
| 2,301,960 | Lermont et al. | Nov. 17, 1942 |
| 2,337,047 | Hunter | Dec. 21, 1943 |